(No Model.)
S. E. MOWER & G. J. SPENCER.
ELECTRIC MOTOR MECHANISM.
No. 433,904. Patented Aug. 5, 1890.
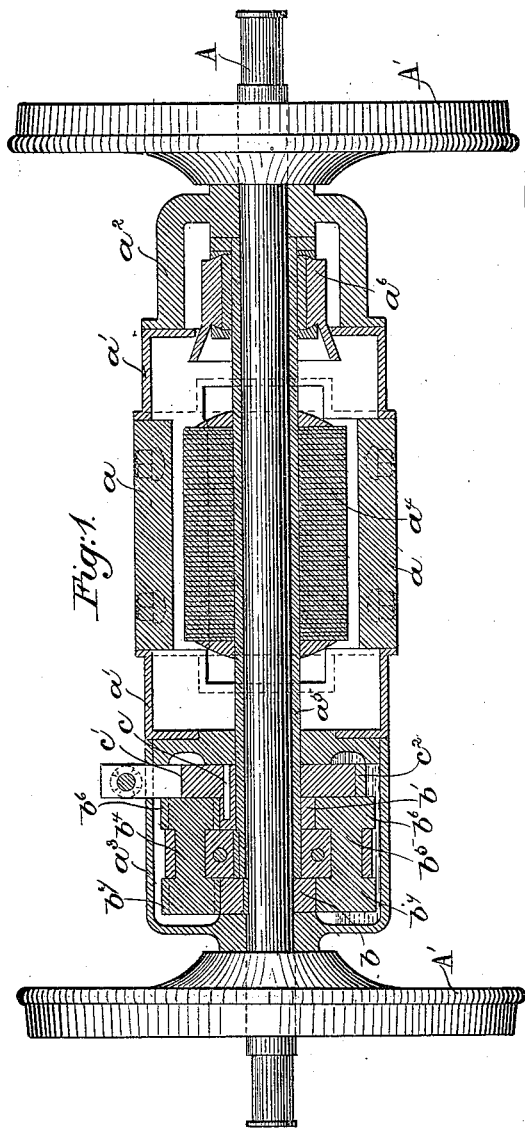
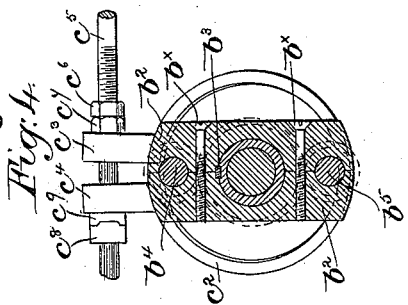
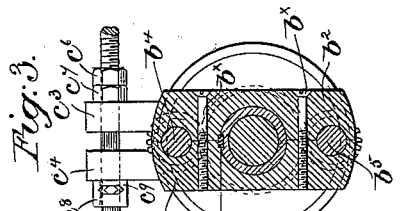
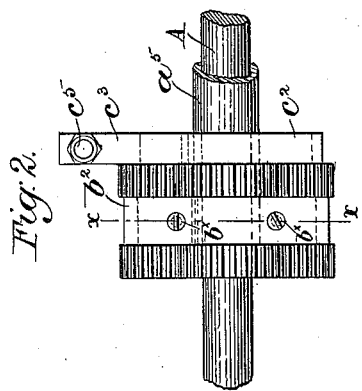
Witnesses:
Arthur S Davis
Frederick L Emery
Inventor:
Samuel E. Mower,
George J. Spencer,
by Combs & Gregory Attys

UNITED STATES PATENT OFFICE.

SAMUEL E. MOWER AND GEORGE J. SPENCER, OF NEW HAVEN, CONNECTICUT, ASSIGNORS TO HENRY G. THOMPSON & SONS, OF SAME PLACE.

ELECTRIC-MOTOR MECHANISM.

SPECIFICATION forming part of Letters Patent No. 433,904, dated August 5, 1890.

Application filed February 14, 1890. Serial No. 340,433. (No model.)

*To all whom it may concern:*

Be it known that we, SAMUEL E. MOWER and GEORGE J. SPENCER, both of New Haven, county of New Haven, State of Connecticut, have invented an Improvement in Electric-Motor Mechanism, of which the following description, in connection with the accompanying drawings, is a specification, like letters on the drawings representing like parts.

This invention in electric-motor mechanism is an improvement upon that shown and described in another application, Serial No. 329,760, filed November 9, 1889, by Samuel Mower, a party to this invention, and has for its object to improve the motor mechanism therein shown, as will be described, whereby the motor may be run continuously and the car-axle on which the motor is secured may be started at any desired speed.

Our invention in electric-motor mechanism therefore consists in the combination, with an axle, of a motor having its armature secured to a sleeve loosely mounted on said axle, a speed-reducing mechanism consisting of a gear fast on the axle, a gear loose on said sleeve, a yoke or arm fast on the sleeve and carrying pinions in mesh with said gears, and a friction-clutch mechanism adapted to hold the gear on the sleeve stationary to produce revolution of the car-axle, substantially as will be described.

Other features of our invention will be pointed out in the claims at the end of this specification.

Figure 1 is a longitudinal section of an electric-motor mechanism embodying our invention applied to a car-axle, the latter being shown in elevation; Fig. 2, a detail in elevation to more clearly illustrate the clutch mechanism; Fig. 3, a section on the line $x$ $x$, Fig. 2, showing the clutch mechanism in operative position; and Fig. 4 a section on the line $x$ $x$, Fig. 2, with the clutch-mechanism in its operative position.

Referring to Fig. 1, the car-axle A, provided with wheels A', the electric motor consisting of field-magnets $a$, having secured to them the hoods $a'$, the yoke $a^2$, and the box $a^3$, secured to said hoods, the armature $a^4$, secured to or forming part of the sleeve $a^5$, loosely mounted on the said axle, the commutator $a^6$, secured to said sleeve near one end thereof, and the speed-reducing mechanism consisting of the gear $b$, keyed or otherwise firmly secured to the axle A, the gear $b'$, having a different number of teeth than the gear $b$, the yoke or arm $b^2$, encircling the loose sleeve $a^5$, and herein shown as made in two parts or halves secured together, as by bolts $b^x$, and fastened to the sleeve, as by key $b^3$, the shafts $b^4$ $b^5$, having bearings in the opposite ends of the yoke $b^2$, and provided with pinions $b^6$ $b^7$, in mesh, respectively, with the gears $b$ $b'$, are and may be substantially such as shown and described in the application referred to, with the exception that the gear $b'$ in the said application is rigidly secured to the hood $a^3$. In accordance with the present invention, the gear $b'$ is loose upon the sleeve $a^5$ and has firmly secured to it, as by bolts or rods $c$, a friction drum or wheel $c'$, also mounted on the said sleeve. The friction-drum $c'$ is encircled by a clutch-strap $c^2$, encircling the said drum and provided with arms $c^3$ $c^4$, through which is extended a rod $c^5$, provided on one side of the arm $c^3$ with check-nuts $c^6$ $c^7$ and on the opposite side of the arm with a cam $c^8$, fast on the said rod and co-operating with a cam $c^9$, interposed between it and the arm $c^4$. The rod $c^5$ in practice will preferably have connected to it a lever, not herein shown, but which is extended up through the car to be operated by the driver or operator.

In operation the rod $c^5$ is turned and the cam $c^8$ is brought into the position shown in Fig. 4 when it is desired the armature-sleeve $a^5$ should run free, the clutch-strap or ring $c^2$ being at such time disengaged from the drum $c'$, as shown in Fig. 4, the gear $b'$ being at rest. With the clutch-strap $c^2$ disengaged from the drum $c'$, as shown in Fig. 4, the armature of the motor may be run continuously without producing motion of the car-axle, for the pinions $b^6$ $b^7$, carried by the yoke $b^2$, will drive the gear $b'$, and the latter, being loose upon the sleeve $a^5$, will rotate freely without producing motion of the gear $b$. If now it is desired to start the car in motion, the operator will move the rod $c^5$ so as to bring the cam $c^8$ into the position shown in Fig. 3, thereby moving the arm $c^4$ of the clutch-strap toward the arm $c^3$ and binding the said strap tightly upon the drum $c'$. The drum $c'$ is in this manner held stationary, and consequently the gear $b'$ is stationary, so that in the movement of the pinions $b^6$ $b^7$ around the gears $b$ $b'$ the gear $b$ will be rotated and the car-axle revolved. It is evident that the operator may turn the rod $c^5$ so as to cause the clutch-strap $c^2$ to engage the drum $c'$ with more or less force and in this manner produce a slower or quick motion of the car-axle.

We have herein shown the eccentric-strap as operated by means of cams on the rod $c^5$; but we do not desire to limit ourselves in this respect, as other equivalent devices may be used—such, for instance, as a screw.

We claim—

1. In an electric-motor mechanism, the combination, with an axle, of a motor having its armature secured to a sleeve loosely mounted on said axle, a speed-reducing mechanism consisting of a gear fast on the axle, a gear loose on said sleeve, a yoke or arm fast on the sleeve and carrying pinions in mesh with said gears, and a friction-clutch mechanism adapted to hold the gear on the sleeve stationary to produce revolution of the car-axle, substantially as described.

2. In an electric-motor mechanism, the combination, with an axle, of a motor having its armature mounted to run loosely on the said axle, a speed-reducing mechanism consisting of a gear $b$, fast on the car-axle, a loose gear $b'$, having a different number of teeth than the gear $b$, an arm or yoke secured to the armature to revolve therewith, gears carried by said arm in mesh with the gears $b$ $b'$, a friction-drum secured to the gear $b'$, a friction-strap, and means to engage said strap with the friction-drum, substantially as described.

In testimony whereof we have signed our names to this specification in the presence of two subscribing witnesses.

SAMUEL E. MOWER.
GEORGE J. SPENCER.

Witnesses:
SAML. LLOYD,
HENRY G. THOMPSON.